No. 838,954. PATENTED DEC. 18, 1906.
E. P. DAMON.
VEHICLE WHEEL.
APPLICATION FILED NOV. 16, 1905.

WITNESSES:
L. Almquist
F. D. _____

INVENTOR
Elmer P. Damon
BY
_____
ATTORNEYS

THE NORRIS PETERS CO., WASHINGTON, D. C.

UNITED STATES PATENT OFFICE.

ELMER P. DAMON, OF PHILLIPSBURG, NEW JERSEY.

VEHICLE-WHEEL.

No. 838,954.     Specification of Letters Patent.     Patented Dec. 18, 1906.

Application filed November 16, 1905. Serial No. 287,604.

*To all whom it may concern:*

Be it known that I, ELMER P. DAMON, a citizen of the United States, and a resident of Phillipsburg, in the county of Warren and State of New Jersey, have invented a new and Improved Vehicle-Wheel, of which the following is a full, clear, and exact description.

This invention relates to vehicle-wheels.

The object of the invention is to produce a wheel which will have highly-resilient qualities operating to reduce the shock which passes to the body of the vehicle when moving over irregularities in the road-bed.

The invention consists in the construction and combinations of parts to be more fully described hereinafter, and definitely set forth in the claim.

Reference is to be had to the accompanying drawings, which illustrate, as an example, the preferred embodiment of my invention, in which drawings like characters of reference indicate like parts in the several views, and in which—

Figure 1:
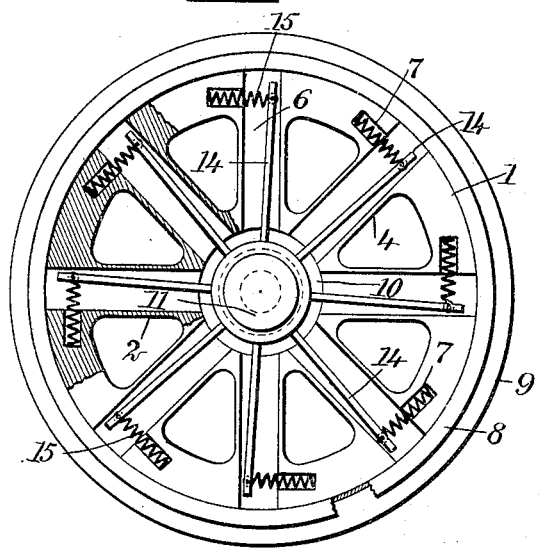
Figure 3:
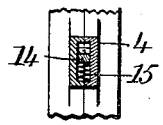
Figure 2:
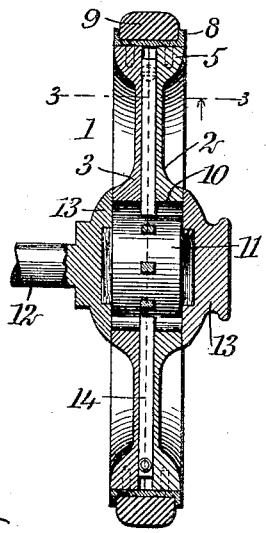

Figure 1 is a central section through the body of the wheel, a portion of which is represented as broken away, together with a portion of the felly. Fig. 2 is a central vertical section taken through the wheel, and showing a portion of the axle, and Fig. 3 is a cross-section taken on the line 3 3 of Fig. 2.

Referring more particularly to the parts, 1 represents the body of the wheel which is composed of two annular disks 2 and 3, which come together, as shown, so as to form spokes 4 and the rim 5. The spokes 4 are provided with longitudinal chambers or openings 6, and the rim 5, at suitable points lying on the same side of the chambers, is provided with a plurality of recesses 7, the purpose of which will appear more fully hereinafter. To the rim 5 I attach a channel-shaped felly 8, which carries a tire 9, which is preferably of the type known as a "cushion-tire" and formed of suitable resilient or elastic material, as indicated. The wheel-body 1 is formed with a central opening or bore 10, as indicated more clearly in Fig. 2. Within this bore 10 there is received a hub 11, the same being attached to the extremity of an axle 12, as shown. At the side faces of this hub projecting collars 13 are formed, which extend over the edges of the bore 10, so as to retain the wheel-body in position, as will be readily understood. In this connection attention is called to the fact that the diameter of the hub 11 is much less than that of the bore 10. The hub 11 is provided with a plurality of inner spokes 14, which simply consist of radial rods or bars which lie in the chambers 6 of the outer spokes, as indicated most clearly in Fig. 1. In the recesses 7 are received, respectively, helical springs 15, which extend out into the chambers 6 and press against the sides of the inner spokes.

With the arrangement described it should be understood that when the wheel is driven along the rotation of the hub of the wheel is transmitted through the inner spokes directly to the rim, the inner spokes pressing against the sides of the chambers 6. When an obstruction such as a rock or small boulder is encountered in the roadway, it strikes the rim, and the shock of striking the same is taken up by the springs, which are compressed. Thus a distortion is produced. After the obstruction is passed the springs return the rim to its normal position.

Having thus described the preferred form of my invention, what I claim as new, and desire to secure by Letters Patent, is—

A wheel of the class described having spokes with radial chambers therein, provided with lateral recesses and a bore in communication with said chambers, a hub mounted in said bore and having projections extending into said chambers, and springs secured to said projections and seated in said recesses.

In testimony whereof I have signed my name to this specification in the presence of two subscribing witnesses.

ELMER P. DAMON.

Witnesses:
    F. D. AMMEN,
    JNO. M. RITTER.